R. B. BENJAMIN.
COMBINATION ELECTRIC LIGHT FIXTURE.
APPLICATION FILED JAN. 6, 1919.
1,404,732.
Patented Jan. 31, 1922.
3 SHEETS—SHEET 1.
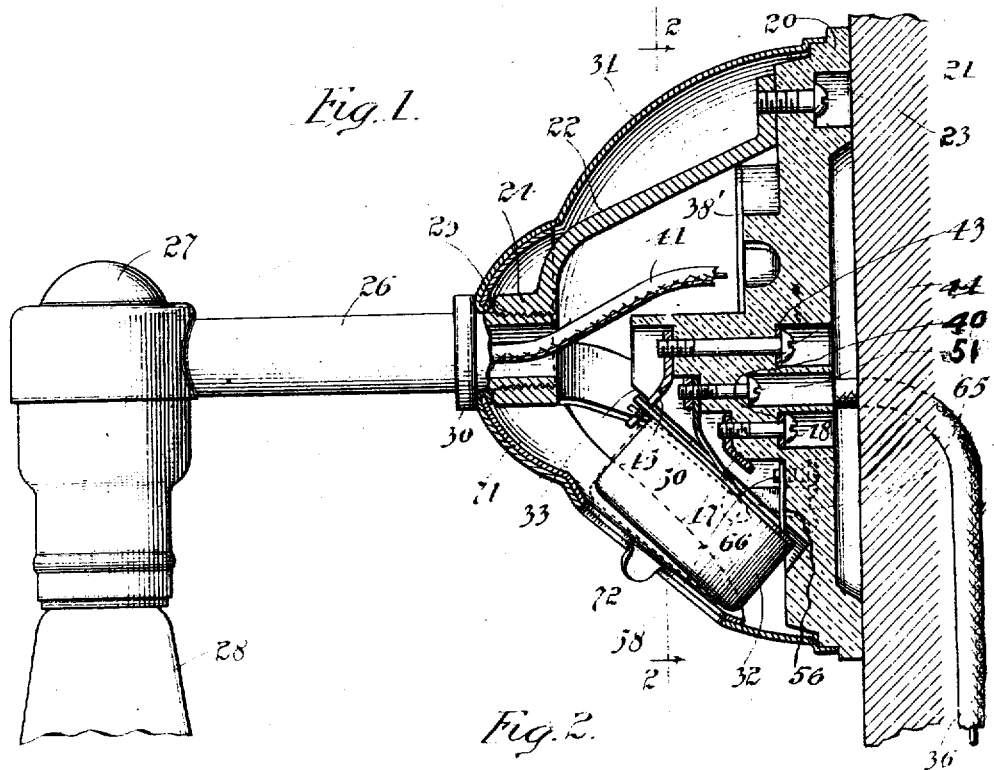
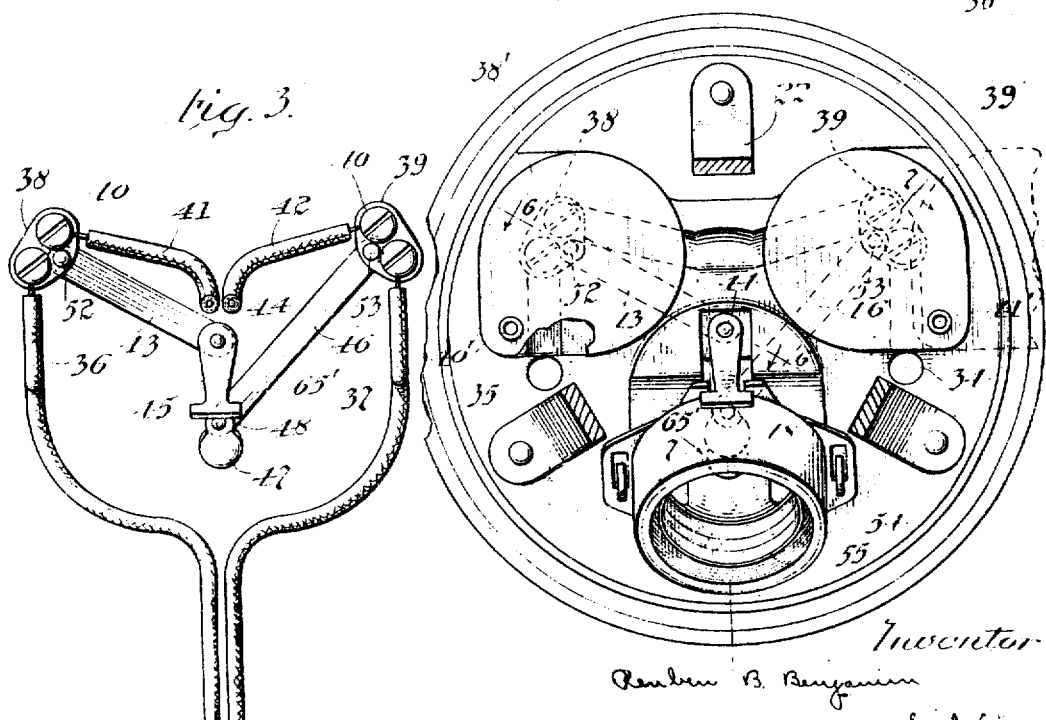

R. B. BENJAMIN.
COMBINATION ELECTRIC LIGHT FIXTURE.
APPLICATION FILED JAN. 6, 1919.
1,404,732.
Patented Jan. 31, 1922
3 SHEETS—SHEET 2.
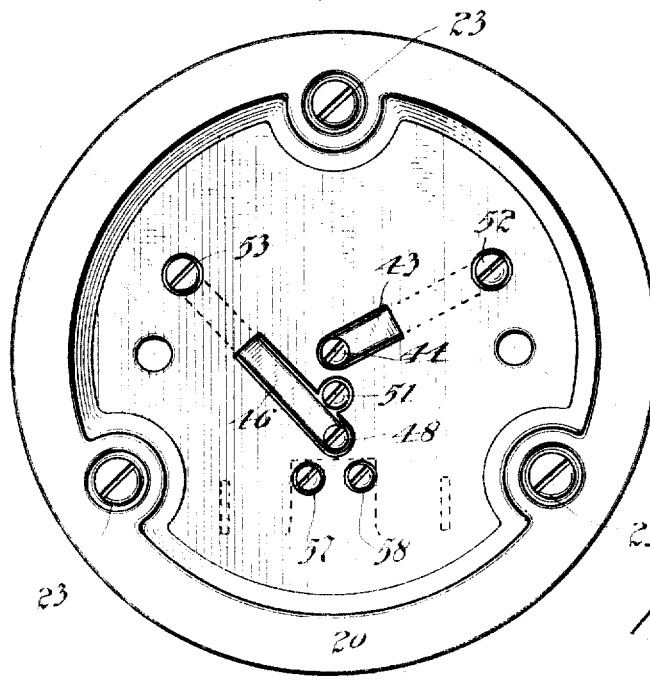
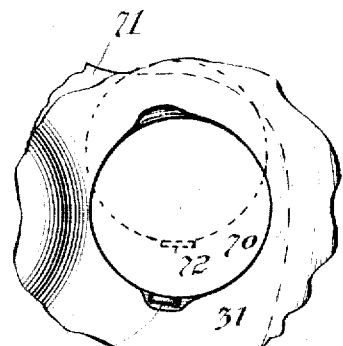
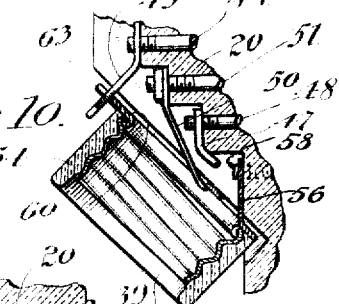
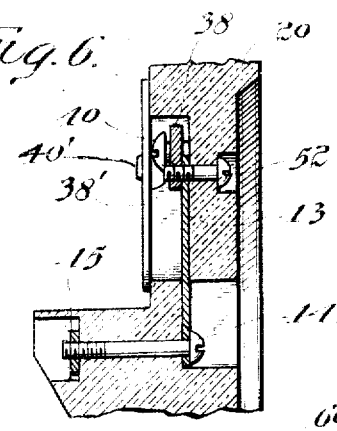
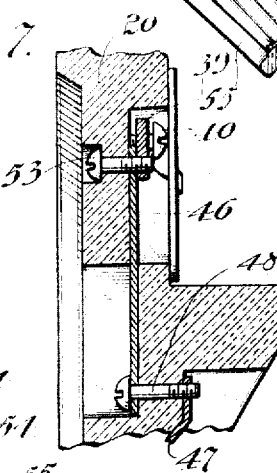
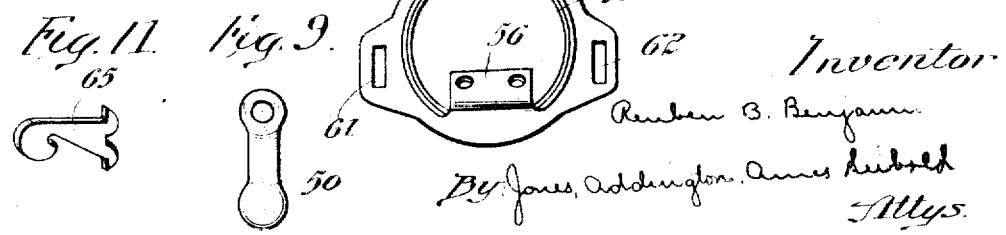

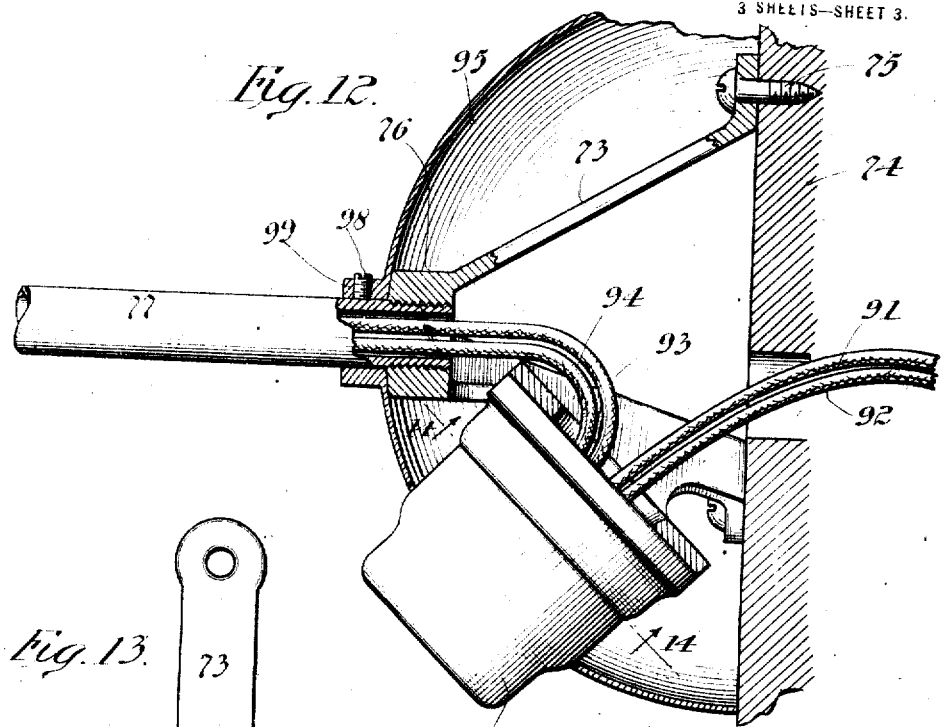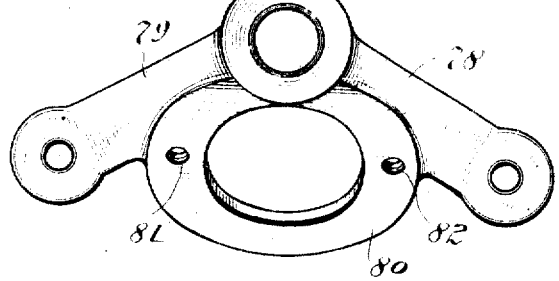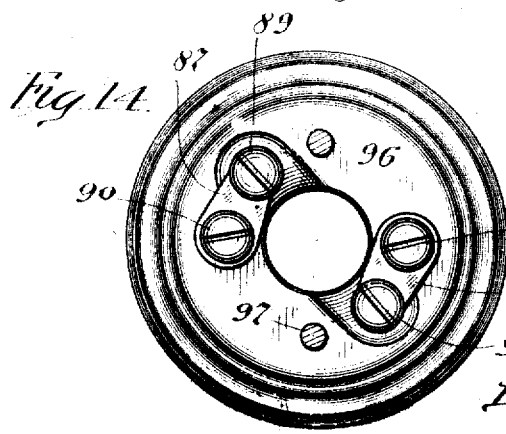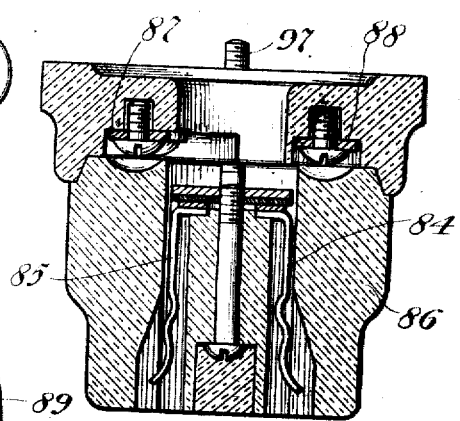

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

COMBINATION ELECTRIC-LIGHT FIXTURE.

1,404,732.  Specification of Letters Patent.  Patented Jan. 31, 1922.

Application filed January 6, 1919. Serial No. 269,759.

*To all whom it may concern:*

Be it known that I, REUBEN B. BENJAMIN, a citizen of the United States, residing at Chicago, in the county of Cook and State of Illinois, have invented new and useful Improvements in Combination Electric-Light Fixtures, of which the following is a full, clear, concise, and exact description, reference being had to the accompanying drawing, forming a part of this specification.

My invention relates to a combination electric light fixture, and, more particularly, to an electric light fixture equipped with an auxiliary current or circuit-trapping means.

In the operation of electrical appliances, such as flat-irons, curling-irons, toasters, coffee-percolators, etc., it has heretofore been necessary to operate such apparatus from an ordinary lighting receptacle either directly without the lamp or with the lamp and a suitable current-tap provided in the lamp-socket. Likewise, it has frequently been the practice to provide wall receptacles which are to be used for operation of such appliances exclusively.

It is one of the objects of this invention to provivde a wall fixture fitted with the usual lighting apparatus comprising the ordinary bracket and socket, and to provide with such wall fixture a neat and efficient as well as ornately arranged auxiliary socket which may be used for a current-tap for operating electrical household appliances.

Another object resides in compactly and neatly arranging under the canopy of the fixture the necessary current-terminal apparatus and providing the necessary facilities for wiring the main current leads to the lighting fixture and to the auxiliary current-tap.

A further feature resides in the production of an apparatus of this kind which as a whole presents a very pleasing appearance and which provides a very convenient and accessible current-tap for household electrical appliances.

Further objects of the invention will become apparent from the following description and the appended claims.

For the purpose of illustration, the preferred form of the invention is shown in the accompanying drawings, in which—

Figure 1 is a side elevation, partly in section, of the complete apparatus;

Fig. 2 is a vertical section taken on the plane represented by the line 2—2 looking in the direction of the arrows;

Fig. 3 illustrates the relative position and method of interconnecting main current-conductors;

Fig. 4 is a rear elevation of the base of the fixture;

Fig. 5 is a detail illustrating the means used to cover the opening in the canopy which leads to the current-tap socket;

Fig. 6 is a vertical section taken on the plane represented by the line 6—6 of Fig. 2 looking in the direction of the arrows;

Fig. 7 is a vertical section taken on the plane represented by the line 7—7 of Fig. 2 looking in the direction of the arrows;

Fig. 8 shows a bottom plan view of a current tap socket;

Fig. 9 is a detail view of the intermediate spring of the center contact of a current-tap socket;

Fig. 10 is a detail view of the bracket, the current-tap socket, and the base of the fixture;

Fig. 11 is a view in side elevation of the bracket used with the current-tap socket;

Fig. 12 illustrates a side view, partly in section, of an alternate form of combination fixture;

Fig. 13 shows the bracket utilized for the mounting of a current-tap and lighting sockets with this form of fixture;

Fig. 14 is a transverse section of the current-tap receptacle taken on a plane represented by the line 14—14 in Fig. 12, and shows the current-plate terminals utilized to receive the wires feeding the current-tap of the lighting fixture; and Fig. 15 is a vertical section of the current-tap plug receptacle used in connection with the alternate form of fixture shown in Fig. 12.

As illustrated in the preferred form shown in the drawings, the apparatus is all mounted on a base 20 which is secured to the wall 21 by any suitable means. The base 20 is made of insulating material and supported thereon is a three-arm bracket 22 which is secured to the base 20 by means of screws such as 23. The forward end of the bracket 22 terminates in a cylindrical collar 24 which is internally threaded, as shown at 25, to receive the threaded end of a conduit or wire-enclosing cylindrical member 26 to which is secured the electric lighting or main socket 27 which carries the electric light globe or bulb 28. The wire-enclosing member 26 is fitted with a bead 30 between which and the collar 24 is fitted the extreme front end of a canopy 31 which covers and completely encloses the bracket 22, the electrical conductors, the current-tap socket 32, and the other apparatus mounted on the base 20. The current-tap socket 32 is positioned on the angularly-disposed face 33 of the base 20, the angle of said face being such that the front face of the current-tap socket 32 is substantially parallel to that portion of the canopy which covers the front face thereof.

The base 20 is fitted with two apertures 34 and 35 through which are fed the main circuit conductors which supply current to the electric light fixtures, these main circuit conductors 36 and 37 being connected to and terminating at the contact terminals 38 and 39 respectively. The contact terminals 38 and 39 are each provided with two contact screws such as 40, two of these screws serving to connect the conductors 36 and 37 thereto, and the two other screws serving to connect the conductors 41 and 42 thereto, these conductors 41 and 42 being wired through the conduit 26 to the socket 27 to feed current to the electric light socket. The contact terminals 38 and 39 are normally obscured and covered by insulating disks 38' and 39' respectively, these disks being pivotedly secured to the base 20 by means of eyelet rivets 40' and 41' respectively.

Conductively secured to the terminal 38 is a conducting bar 43 which is conductively interconnected by means of the screw 44 to the contact spring 45. Conductively connected to the terminal 39 is a conducting bar 46, this bar being in turn conductively connected to the center contact spring 47 by means of the screw 48. An intermediate center contact spring 50 which normally carries no electrical potential is mounted directly above the contact 47, the spring 50 being secured to the base 20 by means of a screw 51.

The terminal plates 38 and 39 are secured to the base 20 by means of screws 52 and 53, respectively. The conducting bars 43 and 46, as clearly illustrated in Fig. 4, are imbedded in the lower surface of the base 20, and are conductively connected to their associated contact springs 45 and 47, respectively, by means of the screws 44 and 48, the screws 44 and 48 extending through the base and connecting with said contact springs which are mounted on the front face of the base.

The auxiliary current-tap socket, as illustrated in Figs. 1, 2, 8, and 9 comprises an insulating base 54 in which is fitted the screw shell contact 55. The insulating base 54 carries a leaf-spring 56 which is secured to the base 20 by means of screws such as 57 and 58. This leaf-spring suspension of the current-tap socket serves to hold said socket close to said base 20 under the resilient effect of the leaf-spring 56.

Secured to the bottom of the shell 54 is a metallic plate 60 which is conductively connected to the shell 55, the said plate carrying slots 61 and 62 and the two projecting prongs 63 and 64. The leaf-spring 56 may be formed integral with this plate 60. Secured to the base 20 are two brackets such as 65, provided with forwardly-extending hook portions such as 66 which project through the slots 61 and 62 in the plate 60. The hooks or prongs 66 on the brackets 65 serve to limit the forward movement of the current-tap socket and likewise serve to provide a fulcrum about which said socket pivots when moved out of its normal position upon the insertion of a plug, as hereinafter described.

Normally, the center contact 50 and the shell contact 55 carry no potential, but when a plug is screwed into the shell contact 55 in the recepatcle 54, the center contact of the plug will make contact with the terminal spring 50. When this contact is made, a force will be exerted, upon further screwing in of the plug, which will cause the receptacle to swing or tilt about the fulcrum provided by the brackets 65, against the tension of the spring 56, thereby causing the protruding lugs 63 and 64 of the plate 60 to approach the cross-piece 65' on the terminal contact 45. As the plug is screwed deeper into the socket, the current-tap receptacle will continue to tilt about its fulcrum until the lugs 63 and 64 make contact with the cross-piece 65' of the terminal contact 45, and thus connect the plate 60 with one side of the circuit through the terminal contact 45, the conductor bar 43, the terminal plate 38, and the main circuit-lead 36. As the plate 60 is conductively connected to the shell contact 55, this operation will place the potential of the line-lead 36 on the shell contact 55. Likewise, as the plug is screwed home, the intermediate spring 50 will be deflected until it makes contact with the terminal plate 47, thereby connecting the center contact and the plug through the intermediate spring 50, the terminal spring 47, screw 48, conducting bar 46, and the terminal plate 39 to the main conductor lead 37.

From the preceding description it will be apparent that, under normal conditions, when the plug is not in the current-tap socket, the shell and center contacts thereof will be dead, that is, carry no potential; and likewise that when a plug is inserted in said socket and screwed home the receptacle 54 will be tilted to place potential on the shell contact 55, and the intermediate spring 50 will be deflected to connect with the terminal spring 47 to connect the line potential to the center contact of the plug.

An opening 70 in the canopy permits access to the current-tap receptacle. This opening can be ordinarily kept closed in order to make a sightly and pleasing appearance, by a shell 71 snugly fitting inside of the canopy and having the same contour as the said canopy; said shell 71 being fitted with protruding lugs 72, whereby said shell may be rotated concentrically with said canopy and moved to a position to completely close the opening 70 in the canopy 31. This is clearly illustrated in Fig. 5. In the full-line position there shown the hole in the canopy is completely closed, in which position the protruding lug 72 is moved forward across the opening 70 so as to move the inner shell 71 into a position where the said shell will completely enclose the opening 70. The broken-line position in this figure shows the inner shell 71 in the position in which the current plug receptacle is partly exposed through the opening 70 in the canopy.

The operation of connecting a plug to the current-tap socket may now be briefly described as follows: The shell 71 is first moved to a position so as to completely expose the current-tap receptacle through the opening 70 in the canopy. The plug may now be screwed into the threaded shell of the receptacle, whereupon the receptacle will be tilted and the intermediate spring 50 depressed so as to connect the threaded shell and the center contact of the plug with the potential and current-carrying springs connected to the main circuit-leads 36 and 37, as hereinbefore described. When access to the current-tap receptacle is no longer desired, the plug is removed, the inner shell 71 is moved by means of one of the lugs 72 to a position in which the opening 70 in the canopy is completely covered, thereby completely obscuring the current-tap receptacle and giving a very neat and pleasing appearance to the complete fixture and removing all evidence of the current-tap receptacle when it is not in use.

In the alternate form of fixture shown in Figs. 12 to 15, inclusive, a bracket such as 73 is secured to the wall 74 by means of screws such as 75. The bracket at its forward end is fitted with a collar 76 which is internally threaded to receive the threaded end of a conduit 77 in which the wires are carried to the socket of a lighting socket (not shown). Mounted between the arms 78 and 79 of the bracket 73 is a circular mounting-plate 80 fitted with threaded apertures 81 and 82 which accommodate suitable screws for the mounting of the current-tap receptacle 83. Any form of current-tap receptacle may be mounted on the plate 80, and for illustration purposes I have shown a current-tap receptacle of the blade type, in which the plug is inserted and removed by a direct thrust and pull, respectively. This receptacle is shown in cross-section in Fig. 15, the line contact blades thereof being illustrated at 84 and 85, said blades being mounted upon an insulating base 86 and connected by any suitable means to the terminal contact plates 87 and 88, respectively. These contact plates each carry two terminal-screws, such as 89 and 90, one of said screws on each of said plates being adapted to be connected with one of the service wires 91 or 92, and the other terminal screw on each of said plates being connected to the conductors 93 and 94 which lead to the lighting fixture.

In wiring the fixture, the current-tap receptacle is first connected to the leads 91, 92, 93, and 94, after which the canopy 95 is slipped over the receptacle 83 and then the receptacle is secured in position on the plate 80 by means of the screws 96 and 97. The canopy 95 is then placed in position to cover the bracket 73 and the wiring and is permanently fixed in this position by the tightening of the set-screw 98 in the ring 99 secured to the canopy 95 on the conduit 77.

It will be evident that the alternate form of fixture shown in Figs. 12 to 15, inclusive, although not as ornate or elaborate as the one illustrated in Figs. 1 to 11, inclusive, results in a very simple and efficient structure which may be very cheaply manufactured and in which the current-tap is positioned in a very convenient and accessible location.

Obviously this invention is not limited to the specific embodiment thereof herein illustrated and described, but is capable of many variations within its spirit and scope, as set forth in the following claims:

I claim as new, and desire to secure by letters patent of the United States:

1. In a device of the character described, in combination, an insulating mounting base, a lamp socket and conductor-enclosing means associated therewith, means for supporting said conductor-enclosing means on said bracket, a current-tap socket, means for supporting said current-tap socket on said supporting base, electrical connections for interconnecting said lamp socket and said current-tap socket to the main circuit, a canopy for enclosing said supporting means and said electrical connection, an opening in said canopy to permit access to said curtent-tap socket, and means operable to close the opening in said canopy and completely obscure said current-tap socket.

2. In a device of the character described, in combination, an insulating mounting base, a lamp-socket and conductor-enclosing means associated therewith, means for supporting said conductor-enclosing means on said mounting base, a current-tap socket, shell and center contacts in said current-tap socket, resilient means for supporting said current-tap socket on said mounting base, electrical connections for interconnecting said lamp socket and said current-tap socket with the main circuit, means whereby said current-tap socket is normally disconnected from the main circuit, means whereby said current-tap socket is tilted against the force exerted by its resilient support, when a plug is inserted in said current-tap socket, to connect the shell and center contacts of said socket with the main line circuit, and a canopy for completely enclosing said mounting and supporting means and said electrical interconnections.

3. In a device of the character described, in combination, an insulating supporting base, a socket and current-conductor enclosing means associated therewith, means to support said conductor-enclosing means on said base, a current-tap socket, resilient means for supporting said current tap socket on said base, shell and center contacts in said current-tap socket, said shell and center contacts normally carrying no potential because of the position assumed by said current-tap socket resulting from the resilient means of support, potential-carrying contacts associated with said current-tap socket, means whereby said socket is tilted when a plug is inserted therein to connect said center and shell contacts with said potential-carrying contacts, electrical connections for connecting the potential-carrying contacts of the current-tap socket and the main socket with the line conductors, and a canopy for enclosing said conductor-enclosing supporting means and the electrical connections.

4. In a device of the character described, in combination, an insulating supporting base, a socket and current-conductor enclosing means associated therewith, means to support said conductor-enclosing means on said base, a current-tap socket, resilient means for supporting said current-tap socket on said base, shell and center contacts in said current-tap socket, said shell and center contacts normally carrying no potential because of the position assumed by said current-tap socket resulting from the resilient means of support, potential-carrying contacts associated with said current-tap socket, means whereby said socket is tilted when a plug is inserted therein to connect said center and shell contacts with said potential-carrying contacts, electrical connections for connecting the potential-carrying contacts of the current-tap socket and the main socket with the line conductors, and an opening in said canopy to permit access to the said current-tap socket.

5. In a device of the character described, in combination, an insulating supporting base, a socket and current-conductor enclosing means associated therewith, means to support said conductor-enclosing means on said base, a current-tap socket, resilient means for supporting said current-tap socket on said base, shell and center contacts in said current-tap socket, said shell and center contacts normally carrying no potential because of the position assumed by said current-tap socket resulting from the resilient means of support, potential-carrying contacts associated with said current-tap socket, means whereby said socket is tilted when a plug is inserted therein to connect said center and shell contacts with said potential-carrying contacts, electrical connections for connecting the potential-carrying contacts of the current-tap socket and the main socket with the line conductors, and a canopy for enclosing said conductor-enclosing supporting means and the electrical connections, and means for closing said opening to completely obscure said current-tap socket.

6. In a device of the character described, in combination, an insulating supporting base, a bracket secured to said base, a main socket and conductor-enclosing means associated therewith, means for supporting said conductor-enclosing means on said bracket, a current-tap socket, resilient means for supporting said current-tap socket on said mounting base, said current tap socket carrying shell and center contacts which normally carry no potential, potential-carrying contacts associated with said current-tap socket, the resilient supporting means for said current-tap socket normally maintaining the shell and center contacts of said current-tap socket out of contact with said potential-carrying contacts, line-terminals, conductors for connecting said main socket and said potential-carrying contacts of the current-tap socket with said line-terminals, means whereby when a plug is inserted in said current-tap socket said socket will be tilted and the shell and center contacts thereof will make contact with the potential-carrying contacts, and a canopy for completely enclosing said insulating supporting base, bracket, and the electrical interconnections.

7. In a device of the character described, in combination, an insulating supporting base, a bracket secured to said base, a main socket and conductor-enclosing means associated therewith, means for supporting said conductor-enclosing means on said bracket, a current-tap socket, resilient means for supporting said current-tap socket on said mounting base, said current-tap socket carrying shell and center contacts which normally carry no potential, potential-carrying contacts associated with said current-tap socket, the resilient supporting means for said current-tap socket normally maintaining the shell and center contacts of said current-tap socket out of contact with said potential-carrying contacts, line-terminals, conductors for connecting said main socket and said potential-carrying contacts of the current-tap socket with said line-terminals, means whereby when a plug is inserted in said current-tap socket said socket will be tilted and the shell and center contacts thereof will make contact with the potential-carrying contacts, and a canopy for completely enclosing said insulating supporting base, bracket, and the electrical interconnections, and an opening in said canopy to permit access to said current-tap socket, and means operable to close said opening and completely obscure said current-tap socket.

8. An electrical device comprising a spider-shaped bracket, having a central hub and arms radiating therefrom, a lamp socket, a conduit secured to said socket for the feed wires to the socket, said conduit being screwed into said hub portion, an electrical receptacle, means for supporting said electrical receptacle adjacent said spider, and a canopy for housing said spider and receptacle, said receptacle having a portion embraced by the arms of the spider.

9. An electrical device comprising a lamp socket, a conduit for the feed wires of said socket, secured to said socket, a canopy through which said conduit extends, an electrical receptacle in said canopy, said canopy having an opening affording access to said receptacle, and a closure for said opening, said closure being mounted to swing about the axis of said conduit.

10. In a device of the character described, in combination, an insulating mounting base, fixture supporting means on said mounting base, a current-tap socket, shell and center contacts in said current-tap socket, resilient means for supporting said current-tap socket on said mounting base, electrical connections for interconnecting the fixture and said current-tap socket with the main circuit, means whereby said current-tap socket is normally disconnected from the main circuit, means whereby said current-tap socket is tilted against the force exerted by its resilient support, when a plug is inserted in said current-tap socket, to connect the shell and center contacts of said socket with the main line circuit, and a canopy for completely enclosing said mounting and supporting means and said electrical interconnections.

In witness whereof, I have hereunto subscribed my name.

REUBEN B. BENJAMIN.